United States Patent [19]

Mort

[11] Patent Number: 5,394,803
[45] Date of Patent: Mar. 7, 1995

[54] JOINT CONSTRUCTION BETWEEN MILITARY ROCKET MOTOR AND WARHEAD AND RELEASABLE BY MELTING OF FUSIBLE EUTECTIC WEDGING RING FOR OPERATING FLEXIBLE LOCKING FINGERS

[75] Inventor: Raymond W. Mort, Hurst, Tex.

[73] Assignee: Bel Electronics, Inc., San Francisco, Calif.

[21] Appl. No.: 195,126

[22] Filed: Feb. 14, 1994

[51] Int. Cl.[6] .............................................. F42B 39/14
[52] U.S. Cl. ...................................... 102/377; 102/481
[58] Field of Search ..................... 102/377, 481; 285/2, 285/187

[56] References Cited

U.S. PATENT DOCUMENTS

| | | | |
|---|---|---|---|
| 3,262,351 | 7/1966 | Webb | 89/1.14 |
| 3,887,991 | 6/1975 | Panella | 60/223 |
| 3,927,791 | 12/1975 | Herseberger | 102/481 |
| 4,494,373 | 1/1985 | Vetter et al. | 60/253 |
| 4,516,499 | 5/1985 | Eymon | 102/377 |
| 4,597,261 | 7/1986 | Dolan | 60/223 |
| 5,035,180 | 7/1991 | Purcell et al. | 102/481 |
| 5,337,672 | 8/1994 | Boissiere et al. | 102/481 |

Primary Examiner—David Brown
Attorney, Agent, or Firm—Palmatier & Zummer

[57] ABSTRACT

The joint construction comprises a coupling ring slidably received in a motor tube connected to the front end of the military rocket motor. The coupling ring is formed with longitudinal slots alternating with flexible fingers having locking projections engageable with a locking channel and an adjacent locking flange within the tube. An adapter ring is connected to the warhead by first screw threads and is adapted to be connected to the coupling ring by second screw threads including external threads on the adapter ring and internal threads in the coupling ring. The adapter ring has a reduced tapered end portion for receiving a wedging tapered expansion ring made of a eutectic metal alloy having a low melting point. As the second screw threads are engaged, the expansion ring flexes the fingers outwardly by a wedging action and causes the projections to interlock with the channel and the flange. If the joint construction is exposed to the heat of a fire or the like, the expansion ring melts and allows the fingers to spring inwardly whereby the projections are unlocked from the channel and the flange, so that the warhead is disconnected from the rocket motor before it is heated sufficiently to ignite the propellant charge therein.

22 Claims, 4 Drawing Sheets

FIG.1

# JOINT CONSTRUCTION BETWEEN MILITARY ROCKET MOTOR AND WARHEAD AND RELEASABLE BY MELTING OF FUSIBLE EUTECTIC WEDGING RING FOR OPERATING FLEXIBLE LOCKING FINGERS

FIELD OF THE INVENTION

This invention relates generally to military ordnance rockets and pertains particularly to a joint construction between a military rocket motor and its warhead and releasable by melting of a fusible eutectic wedging ring for operating flexible locking fingers, whereby the military rocket motor and its warhead are disconnected by the heat of a fire or the like.

BACKGROUND OF THE INVENTION

Occasionally, military ordnance rockets may be exposed to the heat of a fire which may become sufficiently intense to ignite the propulsion charge in the military rocket motor, whereby the warhead of the military rocket is propelled in an uncontrolled manner, with potentially disastrous results. To prevent such disastrous results, a need exists to provide a releasable joint construction for use between a military rocket motor and its warhead whereby the heat of a fire causes disconnection of the joint between the military rocket motor and its warhead at a relatively low temperature, before the rocket motor is heated to a sufficiently high temperature to ignite the propellant charge therein. In many cases, the action of gravity will cause separation of the warhead from the rocket motor. In any event, the rocket motor can be constructed and arranged to cause immediate separation of the warhead from the rocket motor if the propellant charge is ignited by the heat of a fire or the like.

OBJECTS OF THE INVENTION

One object of the present invention is to provide a new and improved joint construction for use between a military rocket motor and its warhead, whereby the heat of a fire or the like will cause disconnection of the joint between the rocket motor and its warhead, before the rocket motor is heated to a sufficiently high temperature to cause ignition of the propellant charge therein.

A further object is to provide a new and improved joint construction of the foregoing character in which the joint is held together by a fusible element, preferably made of a eutectic metal alloy, which will melt at a low temperature so that the joint becomes disconnected before the rocket motor is heated to a sufficiently high temperature to ignite the propellant charge therein.

Another object of the present invention is to provide a new and improved joint construction of the foregoing character in which the fusible element is adapted to operate a coupling mechanism or means, adapted to be released when the fusible element is melted.

SUMMARY OF THE INVENTION

To achieve these objects, the present invention may provide a joint construction for use between a military rocket motor and a warhead adapted to be propelled by the motor, the joint construction comprising a generally cylindrical motor tube component having a connection to the front end of the rocket motor, a generally cylindrical casing component on the rear end of the warhead, a generally tubular adapter ring having means thereon for securing the adapter ring to the casing component, the adapter ring having a reduced rear portion, a generally cylindrical coupling ring for receiving the reduced rear portion of the adapter ring, the coupling ring having a rear portion formed with a plurality of circumferentially spaced, generally longitudinal slots dividing the rear portion into a plurality of radially flexible fingers, the fingers having respective rear end portions with radial projections thereon, the motor tube component having a tubular front portion for receiving the fingers of the coupling ring, the tubular front portion having an internal annular flange therein for interlocking with the radial projections on the fingers, a fusible expansion ring for reception between the inner sides of the fingers and the outside of the reduced rear portion of the adapter ring, the expansion ring as well as the fingers and the reduced rear portion of the adapter ring being configured to produce a wedging action between the expansion ring and the fingers, and interengageable screw thread means on the adapter ring and the coupling ring for assembling the rings while producing rearward force between the reduced rear portion of the adapter ring and the expansion ring so that movement of the expansion ring into its fully assembled position between the adapter ring and the fingers causes radially outward flexing movement of the fingers whereby the projections thereon interlock with the internal flange to afford a secure connection between the coupling ring and the motor tube component, the fusible expansion ring being made of a substantially eutectic metal alloy having a low melting point whereby the application of heat to the joint construction by a fire or the like will melt the expansion ring so that the fingers will spring inwardly out of interlocking engagement with the internal flange, thereby disengaging the motor tube component from the coupling ring.

The reduced rear portion of the adapter ring preferably has an annular tapered outer surface for engaging the expansion ring to produce at least a portion of the wedging action.

The expansion ring preferably has an annular tapered surface to produce at least a portion of the wedging action.

The expansion ring preferably has an annular tapered outer surface for engaging the inner sides of the fingers to produce at least a portion of the wedging action.

The reduced rear portion of the adapter ring preferably has an annular tapered outer surface while the expansion ring has an annular tapered inner surface for engaging the tapered outer surface to produce at least a portion of the wedging action.

The screw thread means preferably comprise external screw threads on the adapter ring and internal screw threads in the coupling ring for receiving the external screw threads.

The fusible expansion ring is preferably made of a substantially eutectic metal alloy comprising tin, cadmium and zinc and having a low melting point.

In a more generalized aspect, the present invention may provide a joint construction for use between a military rocket motor and a warhead adapted to be propelled by the motor, the joint construction comprising first and second generally cylindrical tubular components, one of the components being adapted to be secured to the rocket motor while the other component is adapted to be secured to the warhead, a generally cylindrical coupling ring adapted to be connected between the first and second tubular components, the coupling ring having a first end portion receivable within the first tubular component and formed with a plurality of circumferentially spaced longitudinal slots dividing the first end portion into a plurality of circumferentially spaced radially flexible fingers, interengageable screw thread means on the coupling ring and the second tubular component for securely assembling the coupling ring and the second tubular component, the fingers having respective locking elements thereon, the first tubular component having an internal locking formation opposite the fingers and adapted to interlock with the locking elements, the second tubular component having a reduced end portion adapted to be received within the coupling ring, and a fusible wedging expansion ring receivable around the reduced end portion of the second tubular component and within the coupling ring opposite the fingers for flexing the fingers outwardly and thereby moving the locking elements into secure interlocking relation with the locking formation when the second tubular component and the coupling ring are fully assembled by fully engaging the interengageable screw thread means, the wedging expansion ring and the reduced end portion of the second tubular component as well as the fingers being configured to produce a wedging action for flexing the fingers, the fusible expansion ring being made of a metallic material having a low melting point and being adapted to be melted by the heat of a fire or the like to provide for inward spring return movement of the fingers and thereby to release the interlocking connection between the locking elements and the locking formation whereby the coupling ring is disconnected from the first tubular component so that the warhead is disconnected from the rocket motor.

In a still more generalized aspect, the present invention may provide a joint construction for use between a military rocket motor and a warhead adapted to be propelled by the motor, the joint construction comprising first and second generally cylindrical tubular components, one of the components being adapted to be secured to the rocket motor while the other of the components is adapted to be secured to the warhead, a generally cylindrical coupling ring adapted to be connected between the first and second tubular components and having a plurality of circumferentially spaced fingers receivable within the first tubular component and movable outwardly therein while being resiliently biased inwardly, interengageable screw thread means on the coupling ring and the second tubular component for securely assembling the coupling ring and the second tubular component, the fingers having respective locking elements thereon, the first tubular component having internal annular locking means opposite the fingers and adapted to interlock with the locking elements thereon, the second tubular component having a reduced end portion adapted to be received within the coupling ring, and a fusible wedging expansion ring receivable around the reduced end portion of the second tubular component and within the coupling ring opposite the fingers for moving the fingers outwardly and thereby moving the locking elements into secure interlocking engagement with the locking means when the second tubular component and the coupling ring are fully assembled by fully engaging the interengageable screw thread means, the wedging expansion ring and the fingers as well as the reduced end portion of the second tubular component being configured to produce a wedging action for moving the fingers outwardly and thereby producing interlocking engagement between the locking elements and the locking means, the fusible expansion ring being made of a metallic material having a low melting point and being adapted to be melted by the heat of a fire or the like to provide for inward return movement of the fingers to release the interlocking connection between the locking elements and the locking means whereby the coupling ring is disconnected from the first tubular component.

In another aspect, the present invention may provide a joint construction for use between a military rocket motor and a warhead adapted to be propelled by the motor, the joint construction comprising first and second generally cylindrical tubular components, one of the components being adapted to be secured to the rocket motor while the other of the components is adapted to be secured to the warhead, a generally cylindrical coupling ring adapted to be connected between the first and second tubular components, and having a first end portion engageable with the first tubular component in a telescopic relationship therewith and formed with a plurality of circumferentially spaced longitudinal slots dividing the first end portion into a plurality of circumferentially spaced flexible fingers, interengageable screw thread means on the coupling ring and the second tubular component for securely assembling the coupling ring and the second tubular component, the fingers having respective locking elements thereon, the first tubular component having annular locking means opposite the fingers and adapted to interlock with the locking elements thereon, the second tubular component having an end portion adapted to be assembled with the coupling ring in a telescopic relationship, and a fusible wedging ring receivable between the second tubular component and the coupling ring opposite the flexible fingers for flexing the fingers and thereby moving the locking elements into secure interlocking relation with the locking means when the second tubular component and the coupling ring are fully assembled by fully engaging the interengageable screw thread means, the wedging ring and the end portion of the second tubular component as well as the fingers being configured to produce a wedging action for flexing the fingers, the fusible ring being made of a metallic material having a low melting point and being adapted to be melted by the heat of a fire or the like to provide for spring return movement of the fingers and thereby to release the interlocking connection between the locking elements and the locking means whereby the coupling ring is disconnected from the first tubular component to disconnect the warhead from the rocket motor.

The locking elements on the fingers may comprise projections thereon. The locking formation or means may comprise an annular flange or channel.

DESCRIPTION OF DRAWINGS

Further objects, advantages and features of the present invention will appear from the following description, taken with the accompanying drawings, in which.

DETAILED DESCRIPTION OF ILLUSTRATIVE EMBODIMENT

Figure 1:
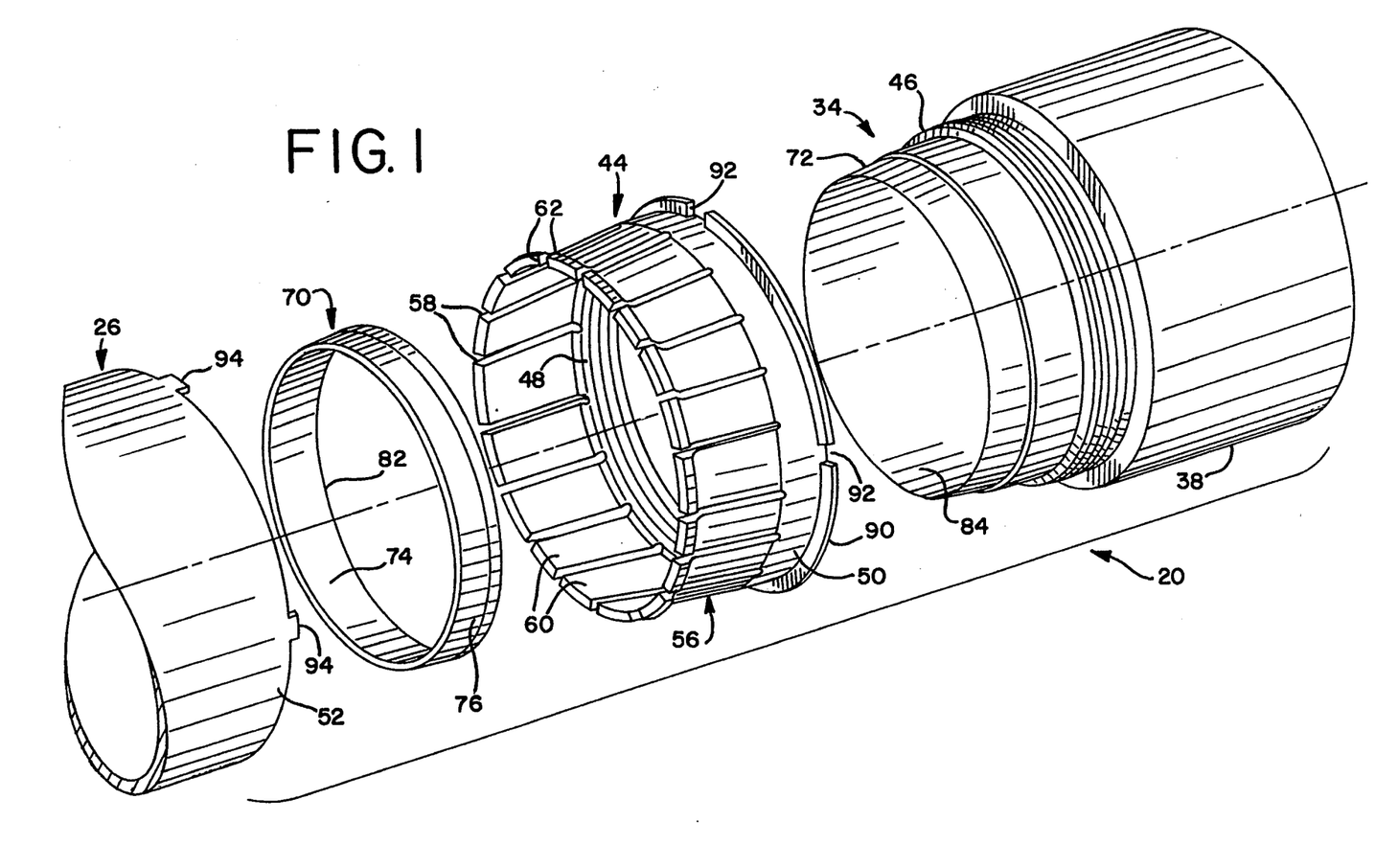
FIG. 1 is a fragmentary, somewhat diagrammatic, exploded perspective view of a joint construction to be described as an illustrative embodiment of the present invention.
Figure 2:
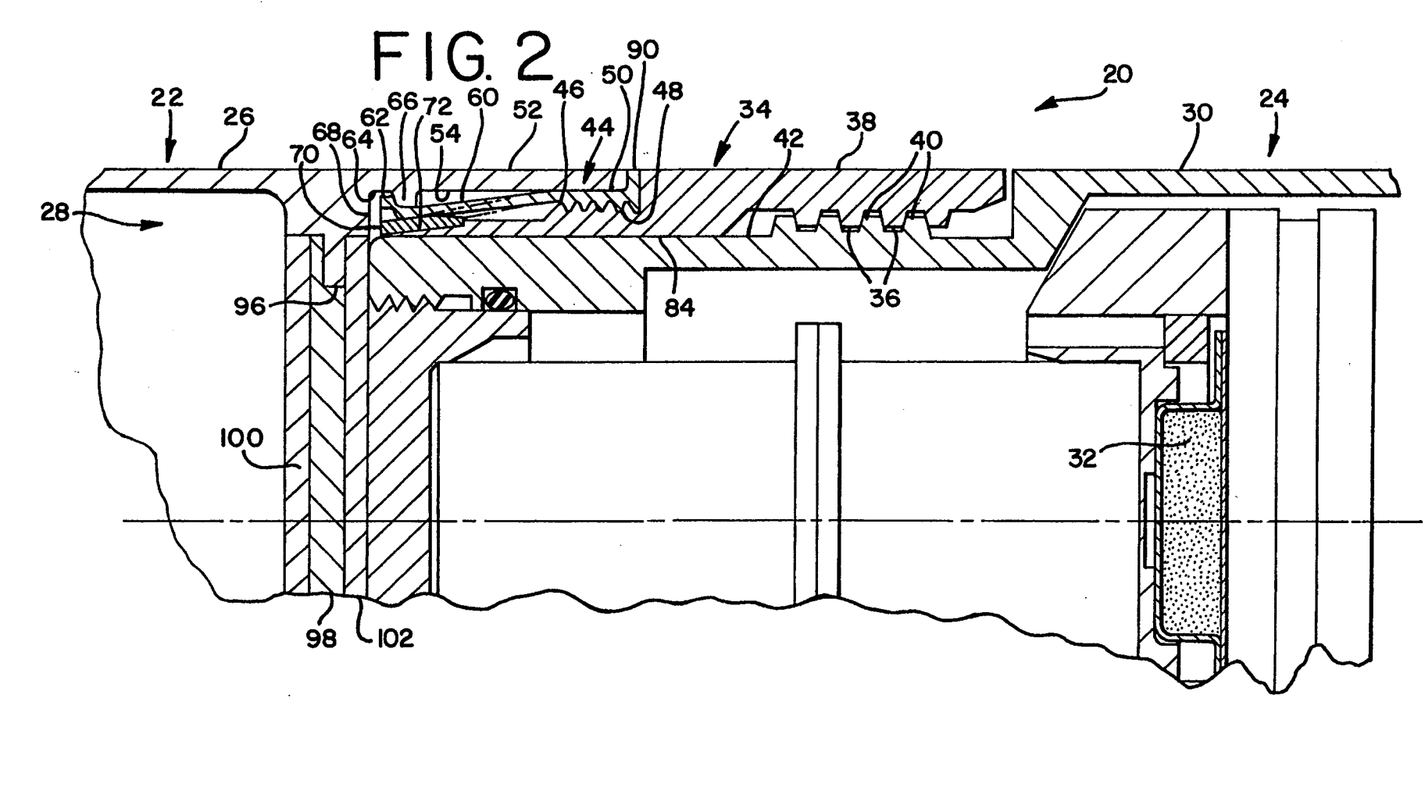
FIG. 2 is a fragmentary longitudinal sectional view taken through the joint construction of FIG. 1.
Figures 3, 4:
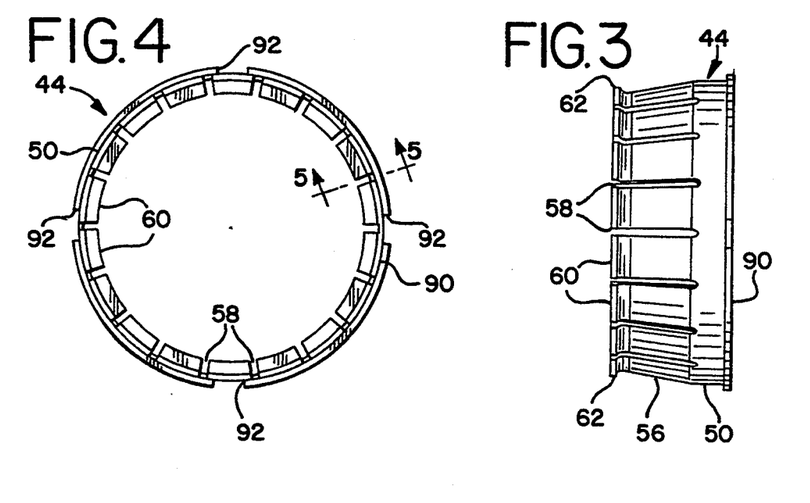
FIG. 3 is a side elevational view of a coupling ring employed in the illustrated joint construction.
FIG. 4 is an end elevational view of the coupling ring.

As just indicated, FIGS. 1 and 2 constitute disassembled and assembled views of a joint construction 20 to be described as an illustrative embodiment of the present invention. The joint construction 20 is adapted to be employed between a military rocket motor 22 and its warhead 24, both of which are shown in a fragmentary manner in FIG. 2. The rocket motor 22 comprises a generally cylindrical motor tube 26 having a chamber 28 therein for receiving a propellant charge, not shown, which, when ignited, is operative to propel the rocket motor 22 and the warhead 24. The warhead 24 comprises a casing 30 adapted to receive explosive weaponry, not shown, and an expulsion charge 32 for expelling the weaponry from the casing 30, when the expulsion charge 32 is detonated.

The illustrated joint construction 20 comprises a tubular component in the form of an annular, generally cylindrical adapter ring 34 which is removably secured to the warhead casing 30 by suitable means, illustrated as comprising internal screw threads 36 formed inside a substantially cylindrical end portion 38 of the adapter ring 34 and removably mated with external screw threads 40 on a reduced, substantially cylindrical portion 42 of the warhead casing 30.

The joint construction 20 also comprises a generally cylindrical coupling ring 44 removably connected between the adapter ring 34 and the rocket motor tube 26. The adapter ring 34 and the coupling ring 44 have interengageable screw thread means, illustrated as comprising external screw threads 46 on the adapter ring 34 and internal screw threads 48 in a substantially cylindrical end portion 50 of the coupling ring 44.

The illustrated rocket motor tube 26 has another tubular component in the form of a substantially cylindrical end portion 52 having a substantially cylindrical opening or internal surface 54 for telescopically and slidably receiving the end portion 50 of the coupling ring 44.

As shown to best advantage in FIGS. 3-6, the coupling ring 44 has a tapered annular frustoconical end portion 56 which is formed with a plurality of circumferentially spaced longitudinal slots 58 which divide the end portion 56 into a plurality of circumferentially spaced flexible resilient fingers 60. The coupling ring 44 is preferably made of a flexible resilient material such as aluminum, aluminum alloy or some other suitable metallic material. Each of the slots 58 extends from the extreme end of the coupling ring 44 along the entire length of the frustoconical portion 56 to the cylindrical end portion 50. The ends of the flexible fingers 60 are provided with locking elements illustrated as outwardly directed projections or knobs or beads 62.

As shown in FIG. 2, the fingers 60 are adapted to be flexed outwardly so as to move the knobs or projections 62 into interlocking engagement with a locking formation or means illustrated as comprising an annular channel 64 and an adjacent annular flange or flange means 66 within the cylindrical opening or internal surface 54 in the end portion 52 of the rocket motor tube 26. The annular flange 66 is illustrated as projecting inwardly on the cylindrical internal surface 54. The opposite side of the channel 64 is bounded by an inwardly projecting flange 68 in the generally cylindrical motor tube 26. The projections 62 are adapted to interlock securely with the flange 66.

The flexible fingers 60 on the coupling ring 44 are adapted to be flexed outwardly by a fusible, substantially eutectic wedging expansion ring 70 telescopically engaged and received around a reduced annular tapered end portion 72 of the adapter ring 34.

The fusible substantially eutectic wedging expansion ring 70 has a much lower melting point than the aluminum or aluminum alloy of which the coupling ring 44 is preferably made. The adapter ring 34 and the motor tube 26 are also preferably made of aluminum or an aluminum alloy. The wedging expansion ring 70 is preferably made of a substantially eutectic metal alloy. By definition, an alloy is eutectic if the constituents of the alloy are proportioned to achieve the lowest possible melting point. Metals having low melting points are generally used in eutectic alloys. By way of example, the wedging expansion ring may be made of a eutectic metal alloy having the following composition:

| Tin | 66.5% |
| Cadmium | 31.0% |
| Zinc | 2.5% |

The percentages are by weight. This eutectic alloy has a melting point of approximately 325° F. The alloy is quite strong until it is heated to a temperature approaching the melting point. Other suitable eutectic alloys may be employed.

Figures 5, 6, 7, 8, 9:
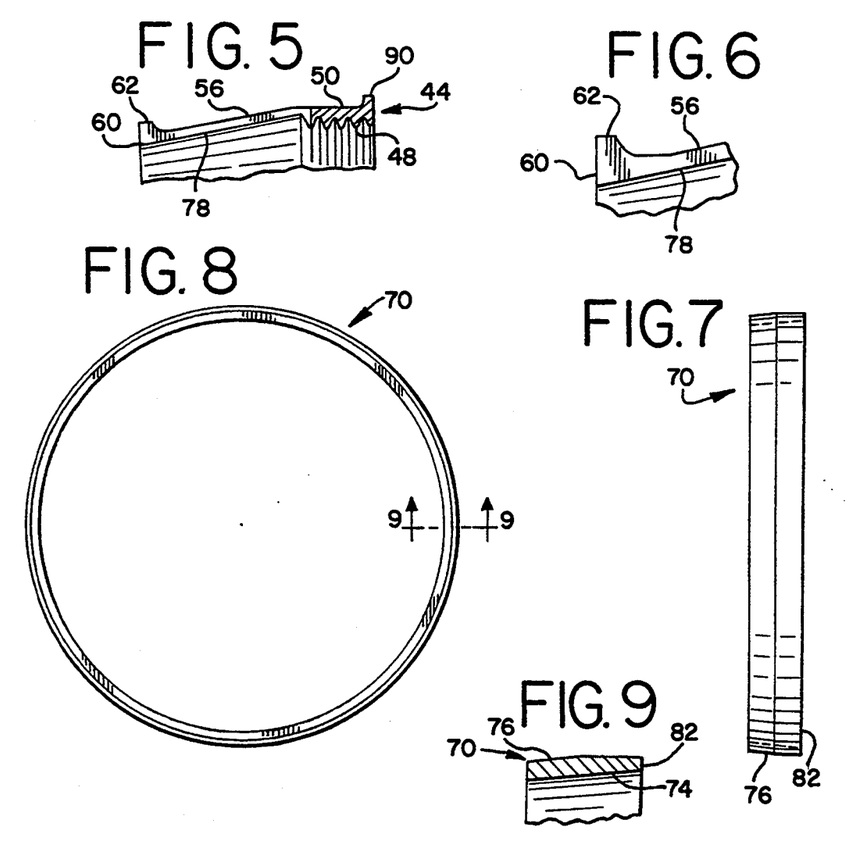
FIG. 5 is a fragmentary section, taken generally along the line 5—5 in FIG. 4.
FIG. 6 is a fragmentary enlarged view corresponding to the left hand portion of FIG. 5.
FIG. 7 is a side elevational view of a fusible eutectic wedging expansion ring employed in the illustrated joint construction.
FIG. 8 is an end elevational view of the fusible ring of FIG. 7.
FIG. 9 is an enlarged fragmentary sectional view, taken generally along the line 9—9 in FIG. 8.

As shown separately in FIGS. 7-9, the wedging expansion ring 70 has an annular tapered internal surface 74 adapted to fit closely around the reduced annular tapered end portion 72 of the adapter ring 34. The ring 70 has an external annular tapered surface 76 adapted to engage internal tapered or slanting surfaces 78 of the flexible fingers 60 on the coupling ring 44. Thus, the expansion ring 70, the flexible fingers 60 and the reduced annular tapered end portion 72 of the adapter ring 34 are configured to produce a wedging action whereby the flexible fingers 60 are flexed outwardly when the wedging expansion ring 70 is pushed within the fingers 60 toward the free ends thereof by the reduced tapered end portion 72 of the adapter ring 34. The pushing force on the wedging expansion ring 70 is produced by the external and internal screw threads 46 and 48 when the coupling ring 44 is screwed into its assembled position on the adapter ring 34. The fully assembled position of the coupling ring 44 is shown in FIG. 2 in which one of the flexible fingers 60 is shown in full lines in its outwardly flexed position with the corresponding projection 62 moved outwardly into interlocking engagement with the channel 64 and the flange 66. The original or unflexed position of the fingers 60 is shown in broken lines in FIG. 2. The fingers 60 are also shown in their original unflexed positions in FIGS. 3–6.

Figure 10:
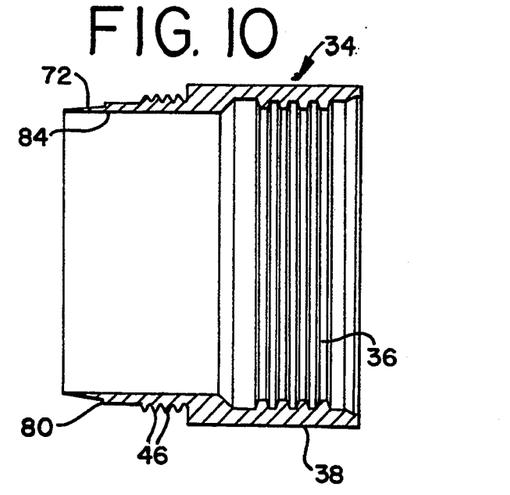
FIG. 10 is a central longitudinal sectional view taken through an adapter ring employed in the illustrated joint construction.
Figure 11:
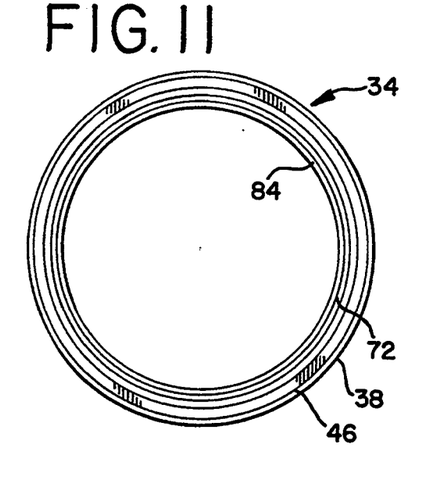
FIG. 11 is an end elevational view of the adapter ring.
Figure 12:
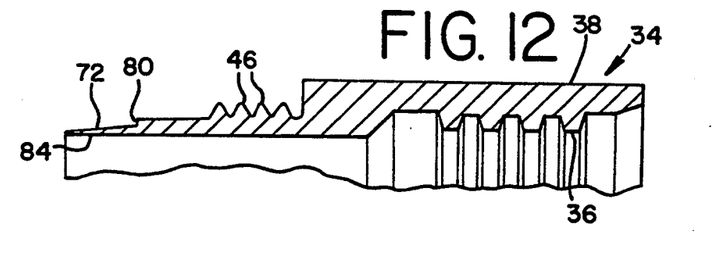
FIG. 12 is a fragmentary enlarged longitudinal section corresponding to the upper portion of FIG. 10.

The adapter ring 34 is shown separately in FIGS. 10–12. As previously indicated, the wedging expansion ring 70 is adapted to be received around the reduced annular tapered end portion 72 of the adapter ring 34. As shown to best advantage in FIGS. 10 and 12, the adapter ring 34 is formed with an annular, generally radial shoulder 80 at the larger end of the tapered end portion 72 and adapted to engage an annular radial end surface 82 on the larger end of the wedging expansion ring 70. The annular shoulder 80 is operative to push the wedging ring 70 into its fully assembled position within the flexible fingers 60 on the coupling ring 44, as shown in FIG. 2, whereby the outwardly projecting knobs 62 on the fingers 60 are moved into interlocking engagement with the channel 4 and the flange 66 on the end portion 52 of the motor tube 26.

The adapter ring 34 is formed with an internal cylindrical surface or bore 84 extending within the portions of the adapter ring 34 on which the external threads 46 and the annular tapered end portion 72 are formed, for slidably receiving the reduced cylindrical portion 42 of the warhead casing 30. The adapter ring 34 is guided and supported by the sliding engagement between the cylindrical portion 42 of the casing 30 and the internal cylindrical surface 84 of the adapter ring 34.

As shown to best advantage in FIG. 1, the coupling ring 44 is formed with a generally radial flange 90 on the end thereof adjacent the cylindrical end portion 50. The radial flange 90 is formed with a plurality of angularly spaced slots or notches 92 for receiving corresponding tabs or keys 94 projecting endwise from the cylindrical end portion 52 of the rocket motor tube 26. The interlocking engagement of the tabs 94 with the slots 92 prevents relative rotation between the coupling ring 44 and the motor tube 26 when the joint construction 20 is being assembled.

In the assembly of the joint construction 20, the coupling ring 44 is inserted within the cylindrical end portion 52 of the rocket motor tube 26 until the external cylindrical end portion 50 of the coupling ring 44 is fully and slidably received within the internal cylindrical surface 54 of the end portion 52. The coupling ring 44 is oriented so that the slots 92 in the radial flange 90 thereon will receive the tabs 94 on the cylindrical end portion 52 of the motor tube 26.

The adapter ring 34 is assembled with the casing 30 of the warhead 24 by inserting the reduced cylindrical end portion 42 of the casing 30 within the internal threads 36 and the internal cylindrical surface 84 on the adapter ring 34 until the external threads 40 on the casing 30 engage the internal threads 36 within the cylindrical end portion 38 of the adapter ring 34, whereupon the adapter ring 34 is rotated until the internal threads 36 and the external threads 40 are fully meshed or engaged, as shown in FIG. 2.

The eutectic wedging expansion ring 70 is then slipped around the reduced tapered end portion 72 of the adapter ring 34, and then the wedging expansion ring 70 is inserted within the coupling ring 44 until the external threads 46 on the adapter ring 34 begin to engage the internal threads 48 on the coupling ring 44. Relative rotation of the rocket motor tube 26 and the warhead casing 30 is then produced by rotating either the tube 26 or the casing 30, so as to cause increasing engagement of the external screw threads 46 and the internal screw threads 48. The increasing engagement between the screw threads 46 and 48 pushes the wedging expansion ring 70 against the flexible fingers 60 and into the coupling ring 44 with sufficient force to flex the fingers 60 outwardly until the projections 62 on the fingers 60 are moved outwardly into full interlocking engagement with the internal channel 64 and against the internal annular flange 66 in the cylindrical end portion 52 of the rocket motor tube 26. By virtue of the interlocking engagement, the joint construction 20 provides a secure connection between the rocket motor 22 and the warhead 24.

If the rocket motor 22 is ever subjected to excessive heat, which might be produced by a nearby fire or the like, the entire joint construction 20, including the eutectic wedging ring 70, is gradually heated. If the joint construction 20 is heated to the relatively low melting temperature of the eutectic wedging ring 70, the ring 70 is melted so that it becomes totally ineffective. The molten eutectic alloy flows into nearby vacant spaces in the joint construction 20. Accordingly, the inherent resilience of the flexible metal fingers 70 causes them to return inwardly to their unexpanded original positions, whereby the projections 62 on the fingers 60 are fully withdrawn from any interlocking engagement with the channel 64 and the flange 66 in the motor tube 26. Accordingly, the joint construction 20 reverts to a fully disconnected state so that gravity or any slight force will cause the rocket motor 22 to separate from its warhead 24.

All of this happens before the propellant charge in the rocket motor 22 is ignited by the heat of the fire.

Figure 13:
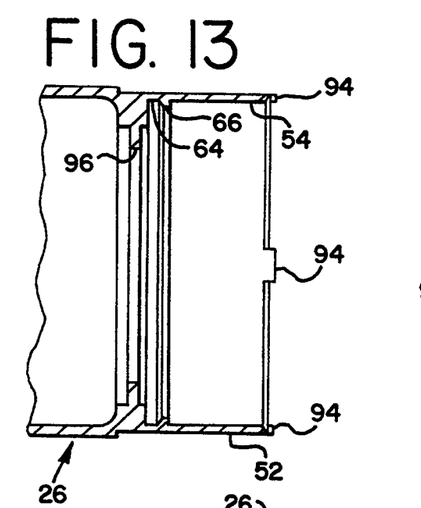
FIG. 13 is a fragmentary central longitudinal section taken through a rocket motor tube employed in the illustrated joint construction.
Figure 14:
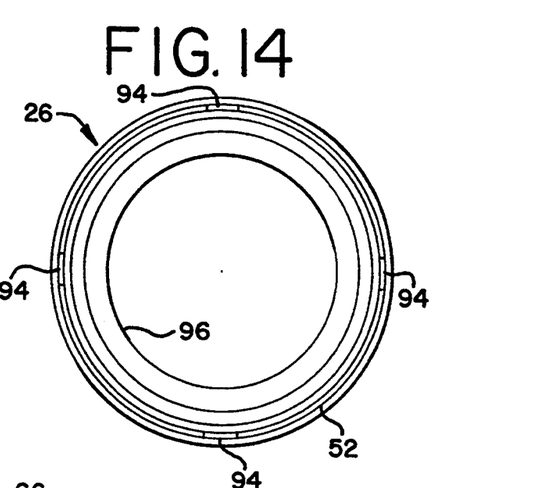
FIG. 14 is an end elevational view of the rocket motor tube of FIG. 13.
Figure 15:
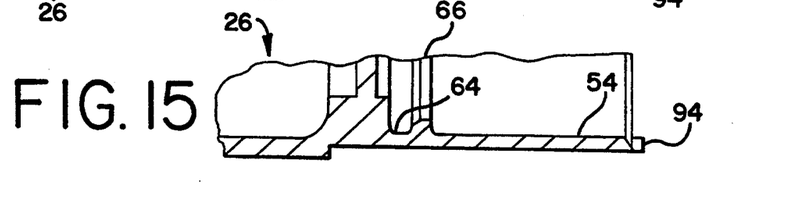
FIG. 15 is a fragmentary enlarged central longitudinal section corresponding to the lower portion of FIG. 13.

The illustrated rocket motor tube 26 also has a front axial vent opening 96 therein which is initially closed by a fusible eutectic disk or plug 98 sandwiched between first and second frangible heat insulator disks 100 and 102. The fusible eutectic disk or plug 98 is made of a substantially eutectic metal alloy, which may be the same alloy of which the fusible wedging expansion ring 70 is made, or any other suitable alloy having a low melting point. If the rocket motor 22 is subjected to the relatively slow heating action of a nearby fire, the fusible eutectic disk or plug 98 will be melted at a relatively low temperature, long before the rocket motor 22 is heated to a sufficiently high temperature to ignite the propellant charge therein. If the propellant charge is ignited, the hot gaseous products of combustion will produce sufficient pressure to break the frangible disks 100 and 102 and to expel them from the front vent opening 96, along with the molten remnants of the fusible eutectic disk 98. The hot gases escaping through the vent opening 96 will cause immediate separation of the warhead 24 from the rocket motor 22. Moreover, the hot gaseous products of combustion which escape forwardly through the vent opening 96 will largely counterbalance the propellant effect of the hot gaseous products of combustion discharged rearwardly from the rocket motor 22, so that the forward propulsive force of the rocket motor 22 will be largely counterbalanced. In any event, the rocket motor 22 will not propel the warhead 24 after it has been separated from the rocket motor 22 by the initial escape of the hot gases through the front vent opening 96.

The joint construction 20 has the advantage of normally providing a very secure connection between the rocket motor 22 and the warhead 24. The secure connection is provided by the interlocking engagement of the projections 62 on the flexible fingers 60 with the channel 64 and the annular flange 66 on the motor tube 26. Both the motor tube 26 and the coupling ring 44 are made of high strength metallic materials, such as aluminum or an aluminum alloy. The eutectic wedging ring 70 is not relied upon directly to withstand the stresses which may be produced between the rocket motor 22 and the warhead 24. The loading on the eutectic wedging ring 70 is compressive in nature and is not increased substantially by any stresses which may be produced between the rocket motor 22 and the warhead 24 during the normal launching and flight of these components of the military rocket.

Moreover, if the eutectic wedging ring 70 should be melted by the slow heat of a fire or the like, the disconnection of the warhead 24 from the rocket motor 22 is immediate and complete, because the flexible fingers 60 on the coupling ring 44 immediately spring inwardly to their original unlocking positions as soon as the eutectic wedging ring 70 is melted.

Various other modifications, alternative constructions and equivalents may be employed without departing from the true spirit and scope of the present invention, as described herein and as defined in the following claims.

I claim:

1. A joint construction for use between a military rocket motor and a warhead adapted to be propelled by said motor, said joint construction comprising
a generally cylindrical motor tube component having a connection to the front end of said rocket motor,
a generally cylindrical casing component on the rear end of said warhead,
a generally tubular adapter ring having means thereon for securing said adapter ring to said casing component,
said adapter ring having a reduced rear portion,
a generally cylindrical coupling ring for receiving said reduced rear portion of said adapter ring,
said coupling ring having a rear portion formed with a plurality of circumferentially spaced, generally longitudinal slots dividing said rear portion into a plurality of radially flexible fingers,
said fingers having respective rear end portions with radial projections thereon,
said motor tube component having a tubular front portion for receiving said fingers of said coupling ring,
said tubular front portion having an internal annular flange therein for interlocking with said radial projections on said fingers,
a fusible expansion ring for reception between the inner sides of said fingers and the outside of said reduced rear portion of said adapter ring,
said expansion ring as well as said fingers and said reduced rear portion of said adapter ring being configured to produce a wedging action between said expansion ring and said fingers,
and interengageable screw thread means on said adapter ring and said coupling ring for assembling said rings while producing rearward force between said reduced rear portion of said adapter ring and said expansion ring so that movement of said expansion ring into its fully assembled position between said adapter ring and said fingers causes radially outward flexing movement of said fingers whereby said projections thereon interlock with said internal flange to afford a secure connection between said coupling ring and said motor tube component,
said fusible expansion ring being made of a substantially eutectic metal alloy having a low melting point whereby the application of heat to said joint construction by a fire or the like will melt said expansion ring so that said fingers will spring inwardly out of interlocking engagement with said internal flange, thereby disengaging said motor tube component from said coupling ring.

2. A joint construction according to claim 1, in which said reduced rear portion of said adapter ring has an annular tapered outer surface for engaging said expansion ring to produce at least a portion of said wedging action.

3. A joint construction according to claim 1, in which said expansion ring has an annular tapered surface to produce at least a portion of said wedging action.

4. A joint construction according to claim 1, in which said expansion ring has an annular tapered outer surface for engaging the inner sides of said fingers to produce at least a portion of said wedging action.

5. A joint construction according to claim 1, in which said reduced rear portion of said adapter ring has an annular tapered outer surface while said expansion ring has an annular tapered inner surface for engaging said tapered outer surface to produce at least a portion of said wedging action.

6. A joint construction according to claim 1, in which said screw thread means comprise external screw threads on said adapter ring and internal screw threads in said coupling ring for receiving said external screw threads.

7. A joint construction for use between a military rocket motor and a warhead adapted to be propelled by said motor, said joint construction comprising
first and second generally cylindrical tubular components,
one of said components being adapted to be secured to said rocket motor while the other of said components is adapted to be secured to said warhead,
a generally cylindrical coupling ring adapted to be connected between said first and second tubular components,
said coupling ring having a first end portion receivable within said first tubular component and formed with a plurality of circumferentially spaced longitudinal slots dividing said first end portion into a plurality of circumferentially spaced radially flexible fingers,
interengageable screw thread means on said coupling ring and said second tubular component for securely assembling said coupling ring and said second tubular component, said fingers having respective locking elements thereon, said first tubular component having an internal locking formation opposite said fingers and adapted to interlock with said locking elements thereon, said second tubular component having a reduced end portion adapted to be received within said coupling ring, and a fusible wedging expansion ring receivable around said reduced end portion of said second tubular component and within said coupling ring opposite said flexible fingers for flexing said fingers outwardly and thereby moving said locking elements into secure interlocking relation with said locking formation when said second tubular component and said coupling ring are fully assembled by fully engaging said interengageable screw thread means, said wedging expansion ring and said reduced end portion of said second tubular component as well as said flexible fingers being configured to produce a wedging action for flexing said fingers, said fusible expansion ring being made of a metallic material having a low melting point and being adapted to be melted by the heat of a fire or the like to provide for inward spring return movement of said fingers and thereby to release the interlocking connection between said locking elements and said locking formation whereby said coupling ring is disconnected from said first tubular component.

8. A joint construction according to claim 7, in which said metallic material comprises a substantially eutectic metal alloy.

9. A joint construction according to claim 7, in which said metallic material comprises a substantially eutectic metal alloy comprising tin, cadmium and zinc.

10. A joint construction according to claim 7, in which said reduced end portion of said second tubular component has an annular tapered outer surface for engaging said expansion ring to produce at least a portion of said wedging action.

11. A joint construction according to claim 7, in which said expansion ring has an annular tapered surface to produce at least a portion of said wedging action.

12. A joint construction according to claim 7, in which said expansion ring has an annular tapered outer surface for engaging the inner sides of said fingers to produce at least a portion of said wedging action.

13. A joint construction according to claim 7, in which said reduced portion of said second tubular component has an annular tapered outer surface while said expansion ring has an annular tapered inner surface for engaging said tapered outer surface to produce at least a portion of said wedging action.

14. A joint construction according to claim 7, in which said locking elements on said fingers comprise generally radial projections thereon, said locking formation comprising an internal annular flange in said first tubular component.

15. A joint construction according to claim 7, in which said locking elements on said fingers comprise generally radial projections thereon, said locking formation comprising an internal annular channel in said first tubular component.

16. A joint construction for use between a military rocket motor and a warhead adapted to be propelled by said motor, said joint construction comprising first and second generally cylindrical tubular components, one of said components being adapted to be secured to said rocket motor while the other of said components is adapted to be secured to said warhead, a generally cylindrical coupling ring adapted to be connected between said first and second tubular components, said coupling ring having a plurality of circumferentially spaced fingers receivable within said first tubular component and movable outwardly therein while being resiliently biased inwardly, interengageable screw thread means on said coupling ring and said second tubular component for securely assembling said coupling ring and said second tubular component, said fingers having respective locking elements thereon, said first tubular component having internal annular locking means opposite said fingers and adapted to interlock with said locking elements thereon, said second tubular component having a reduced end portion adapted to be received within said coupling ring, and a fusible wedging expansion ring receivable around said reduced end portion of said second tubular component and within said coupling ring opposite said fingers for moving said fingers outwardly and thereby moving said locking elements into secure interlocking engagement with said locking means when said second tubular component and said coupling ring are fully assembled by fully engaging said interengageable screw thread means, said wedging expansion ring and said fingers as well as said reduced end portion of said second tubular component being configured to produce a wedging action for moving said fingers outwardly and thereby producing interlocking engagement between said locking elements and said locking means, said fusible expansion ring being made of a metallic material having a low melting point and being adapted to be melted by the heat of a fire or the like to provide for inward return movement of said fingers to release the interlocking connection between said locking elements and said locking means whereby said coupling ring is disconnected from said first tubular component.

17. A joint construction according to claim 16, in which said metallic material comprises a substantially eutectic metal alloy.

18. A joint construction according to claim 16, in which said reduced end portion of said second tubular component has a tapered surface for engaging said expansion ring to produce at least a portion of said wedging action.

19. A joint construction according to claim 16, in which said expansion ring has an annular tapered surface for producing at least a portion of said wedging action.

20. A joint construction according to claim 16, in which said fingers have tapered portions for producing at least a portion of said wedging action.

21. A joint construction for use between a military rocket motor and a warhead adapted to be propelled by said motor, said joint construction comprising

- first and second generally cylindrical tubular components,
- one of said components being adapted to be secured to said rocket motor while the other of said components is adapted to be secured to said warhead,
- a generally cylindrical coupling ring adapted to be connected between said first and second tubular components,
- said coupling ring having a first end portion engageable with said first tubular component in a telescopic relationship therewith and formed with a plurality of circumferentially spaced longitudinal slots dividing said first end portion into a plurality of circumferentially spaced flexible fingers,
- interengageable screw thread means on said coupling ring and said second tubular component for securely assembling said coupling ring and said second tubular component,
- said fingers having respective locking elements thereon,
- said first tubular component having annular locking means opposite said fingers and adapted to interlock with said locking elements thereon,
- said second tubular component having an end portion adapted to be assembled with said coupling ring in a telescopic relationship,
- and a fusible wedging ring receivable between said second tubular component and said coupling ring opposite said flexible fingers for flexing said fingers and thereby moving said locking elements into secure interlocking relation with said annular locking means when said second tubular component and said coupling ring are fully assembled by fully engaging said interengageable screw thread means,
- said wedging ring and said end portion of said second tubular component as well as said flexible fingers being configured to produce a wedging action for flexing said fingers,
- said fusible ring being made of a metallic material having a low melting point and being adapted to be melted by the heat of a fire or the like to provide for spring return movement of said fingers and thereby to release the interlocking connection between said locking elements and said annular locking means whereby said coupling ring is disconnected from said first tubular component to disconnect said warhead from said rocket motor.

22. A joint construction according to claim 21,
- in which said metallic material comprises a substantially eutectic metal alloy to achieve said low melting point.

* * * * *